United States Patent
Boss et al.

(10) Patent No.: US 7,812,724 B2
(45) Date of Patent: Oct. 12, 2010

(54) COUNTERMEASURE SYSTEM TRIGGERED BY MOVEMENT OF A DISPLAY OF A COMPUTING DEVICE

(75) Inventors: Gregory J. Boss, American Fork, UT (US); Rick A. Hamilton, II, Charlottesville, VA (US); George R. Langlais, Nashua, NH (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/843,557

(22) Filed: Aug. 22, 2007

(65) Prior Publication Data

US 2009/0051531 A1    Feb. 26, 2009

(51) Int. Cl.
*G08B 13/14* (2006.01)
(52) U.S. Cl. .................................. 340/568.1
(58) Field of Classification Search ............ 340/571, 340/568.1, 686.1, 687, 686.2, 545.6
See application file for complete search history.

(56) References Cited

U.S. PATENT DOCUMENTS

| | | | | |
|---|---|---|---|---|
| 5,578,991 A | * | 11/1996 | Scholder | 340/571 |
| 5,675,321 A | * | 10/1997 | McBride | 340/568.2 |
| 5,760,690 A | * | 6/1998 | French | 340/571 |
| 5,872,515 A | * | 2/1999 | Ha et al. | 340/571 |
| 6,294,995 B1 | | 9/2001 | Patterson | |
| 6,529,144 B1 | * | 3/2003 | Nilsen et al. | 341/20 |
| 6,970,095 B1 | * | 11/2005 | Lee et al. | 340/669 |
| 7,028,513 B2 | | 4/2006 | Avganim | |
| 7,576,649 B2 | * | 8/2009 | Wu | 340/568.1 |
| 2004/0108968 A1 | | 6/2004 | Finke-Anlauff | |

* cited by examiner

*Primary Examiner*—Phung Nguyen
(74) *Attorney, Agent, or Firm*—John Pivnichny; Roberts Mlotkowski Safran & Cole, P.C.

(57) ABSTRACT

An anti-theft system for portable computing devices, and more particularly, to a countermeasure system and method triggered by movement of a computing screen to prevent the theft of a computing device. The device comprises a base portion, a display portion hingedly attached to the base portion and a sensor configured to detect a motion of the display portion with respect to the base portion. The device further includes a system activated when the sensor detects a motion of the display portion outside a predetermined location.

26 Claims, 6 Drawing Sheets

COUNTERMEASURE SYSTEM TRIGGERED BY MOVEMENT OF A DISPLAY OF A COMPUTING DEVICE

FIELD OF THE INVENTION

The invention generally relates to an anti-theft system for portable computing devices, and more particularly, to a countermeasure system and method triggered by movement of a computing screen to prevent the theft of a computing device.

BACKGROUND OF THE INVENTION

Laptop computers (also referred to as notebook computers, notebooks, and laptops) are rapidly becoming one of the most popular styles of computing devices for both private and commercial users. As integrated circuit features continue to decrease in size and increase in speed, laptop computers routinely offer users computing power that was previously attainable only with desktop computing systems. Moreover, laptop computers provide users with increased mobility, especially when the laptop computer is coupled with a wireless network connection. These benefits have translated to a recent proliferation of laptop computers.

With this increase in laptop computer use, security for these computing devices is becoming more of a concern. Owners of laptop computers want to prevent their machine from being stolen. Moreover, and perhaps more critical, owners of the various information that may be stored on a laptop computer also want to prevent that information from falling into the wrong hands and being used for nefarious purposes, such as, for example, identity theft.

Conventional security devices and systems for laptop computers include cable locks, lockable docking stations, lid locks, and briefcase locks. Such security devices physically secure the laptop computer to a working surface or another object, and utilize keys or other numeric combination style mechanisms to permit authorized access to (i.e., unlock) the computer. These known security devices, however, can typically be broken or beaten (e.g., circumvented) by brute force techniques. That is, conventional cable-locks and pad-locks can be cut or broken. And once such security devices are compromised, the laptop or notebook computer may be easily stolen because it may be folded into a small, compact size that is easily concealed. And, once the laptop is stolen it is possible to access all the data on the laptop.

The above-described known security devices fail to address a primary reason why laptop computers are so easily stolen: the relatively small size of the laptop computer. In essence, as the size of mobile computing devices becomes smaller and smaller, their rate of theft tends to increase due to the ease of taking a unit and sliding it unobtrusively into a bag, under a jacket, etc. As a result, most methods to deter theft of these devices known in the art are marginally effective, at best.

Accordingly, there exists a need in the art to overcome the deficiencies and limitations described hereinabove.

SUMMARY OF THE INVENTION

In a first aspect of the invention, a device comprises a base portion, a display portion hingedly attached to the base portion and a sensor configured to detect a motion of the display portion with respect to the base portion. The device further includes a system activated when the sensor detects a motion of the display portion outside a predetermined location.

In a second aspect of the invention, a device comprises a base portion, a display portion and a hinge attaching the base portion to the display portion. The device further includes a sensor configured to detect a motion of the display portion with respect to the base portion and circuitry for responding to the detection of a closing motion of the display portion.

In a third aspect of the invention, a method comprises detecting an open position of a display portion of a computing device; sensing a motion of the display portion to be outside a predefined range; and providing a countermeasure after a predetermined time has elapsed after the sensed motion.

In a fourth aspect of the invention, a system comprising at least one of a hardware and software component provides theft deterrence for a user of a portable computing device. The at least one of a hardware and software component is configured to: detect an open position of a display portion of a computing device; sense a motion of the display portion to be outside a predefined range; and perform a countermeasure after a predetermined time has elapsed after the sensed motion.

DETAILED DESCRIPTION OF EMBODIMENTS OF THE INVENTION

The invention generally relates to an anti-theft system for portable computing devices, and more particularly, to a countermeasure system and method triggered by movement of a computing screen to prevent the theft of a computing device. In embodiments, a countermeasure may be triggered by a sweep angle of the screen of the computing device. In implementations of the invention, a silent and/or audible electronic alert (countermeasure) mechanism (e.g., circuitry) is designed to alert a user of a potential theft of the computing device. Additionally, the countermeasures, contemplated by the invention, are designed to deter theft when a display of the computing device is moved from a given stationary position. In embodiments, the countermeasures are configured to disable the computing device. In this manner, the invention provides a theft deterrent by disabling access to data on the computing device.

In embodiments, the silent or audible locking mechanism (and other countermeasures) is enabled by a sensor placed in or near the hinge of the display (e.g., screen). This sensor detects when the display has been moved from a particular position, and more specifically, when the display exceeds a predefined sweep angle. If, for any reason, the display is moved from the open position, such as where a thief closes the display, the system will enter a state for a preconfigurable amount of time that allows the owner the capability to defeat the system through the entry of a password authentication process.

Figure 1:
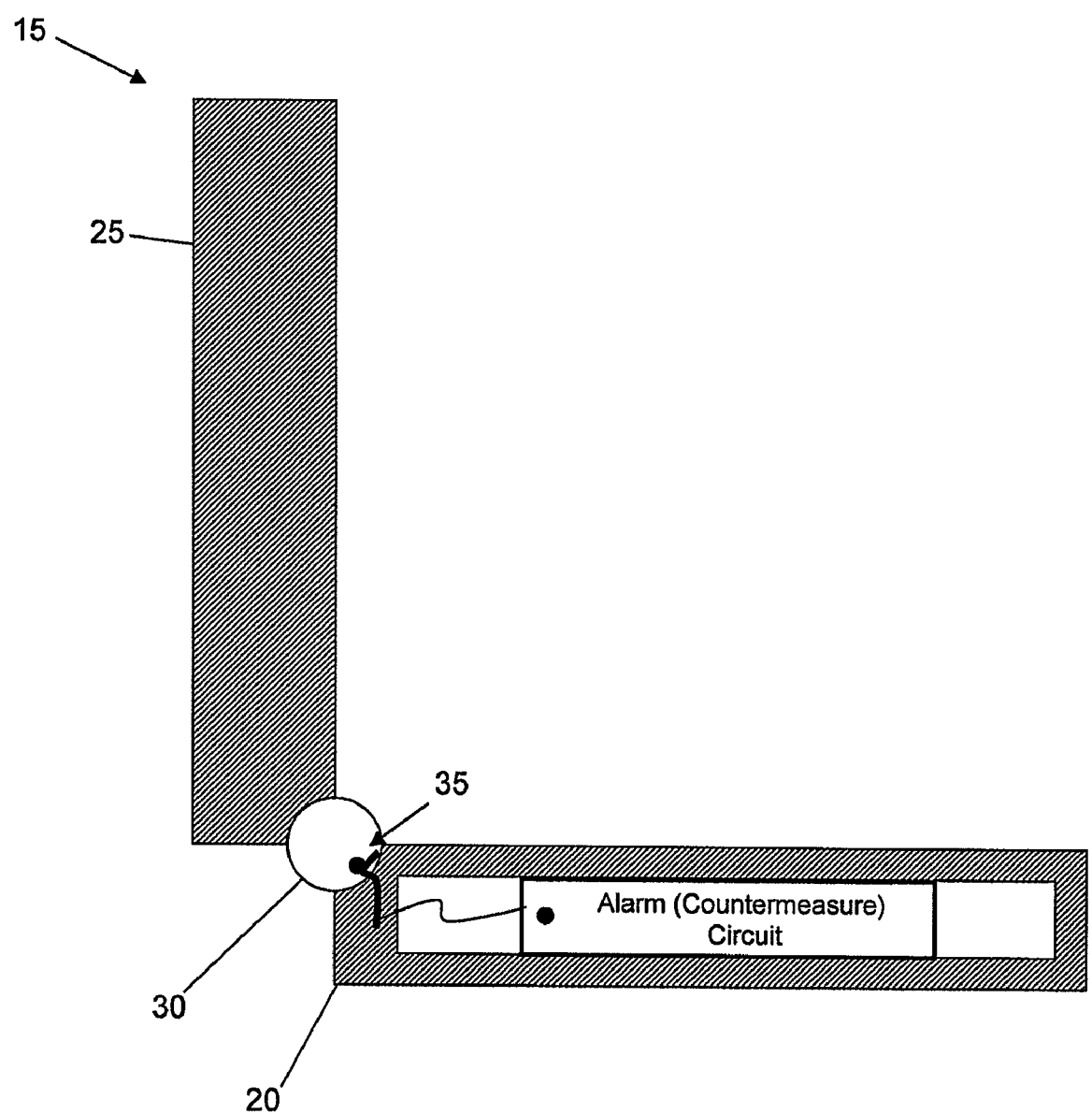
FIG. 1 shows a first embodiment of a sensor according to aspects of the invention.

FIG. 1 shows a foldable computing device implementing the aspects of the invention. A foldable computer 15 (e.g., laptop computer, notebook computer, etc.) has a base portion 20 and display portion 25 that are pivotally connected via a hinge 30, as is known to those of skill in the art. In embodiments, the base portion 20 comprises a base of the computer that includes, for example, a keyboard, motherboard, hard drive, accessory ports, etc. The display portion 25 may comprise, for example, a viewable display, and the hinge 30 may comprise, for example, a pivot hinge that connects and allows for pivotal movement between the base and display portions 20, 25. The base portion 20 and display portion 25 are conventional as described thus far and may comprise any configuration of components and accessories, and may be arranged in any size or shape as dictated by the intended use of the computer.

In implementations, the hinge 30 includes a sensor generally depicted at reference numeral 35. The sensor 35 is configured to sense movement of the display portion 25 with relation to the base portion 20. The sensor may be an electric contact such as a rheostat, a magnetic sensor, or other known sensors that can detect movement of the display portion 25. In one embodiment, the sensor is a sweep angle sensor that is configured to trigger an audible alert when the sweep angle of the display portion 25 is moved beyond a predetermined angle, e.g., 20 degrees from a fully open position. In its simplistic form, the act of closing the computing device will trigger an alert and/or other countermeasure event, which will deter theft of laptop computing device.

Figure 2:
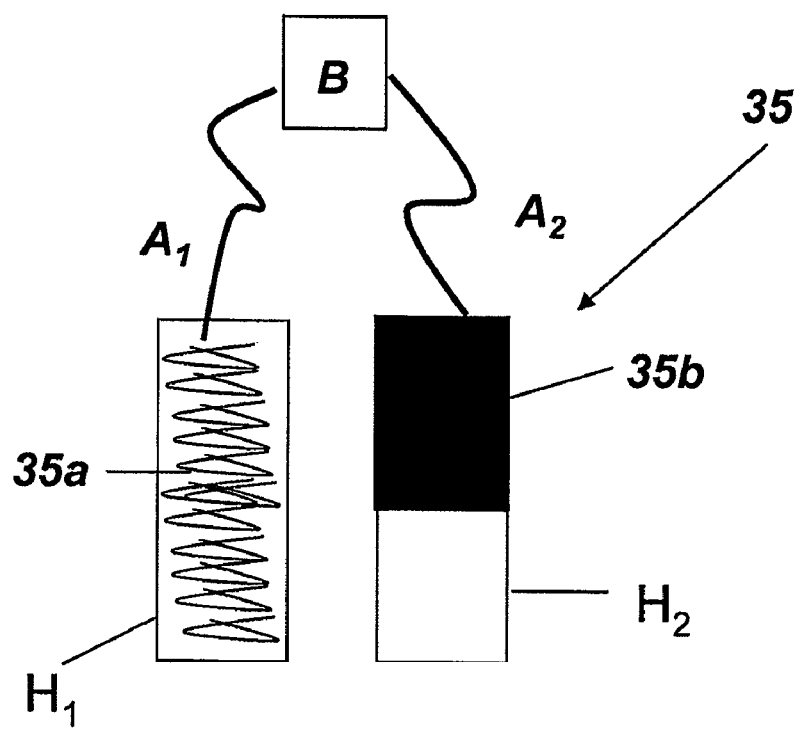
FIG. 2 shows a second embodiment of a sensor according to aspects of the invention.

FIG. 2 shows one type of sensor contemplated for use with the present invention. In this embodiment, the sensor 35 is a rheostat configured to determine the position and more specifically a sweep angle of the display portion 25. In this implementation, the rheostat includes a resistive element 35a (e.g., on a first hinge portion $H_1$) and a contact 35b (on a second hinge portion $H_2$). In embodiments, the first portion of the hinge $H_1$ may be attached to the display portion 25 and the second portion of the hinge portion $H_2$ may be attached to the base portion 20 (or vice versa).

The resistive element 35a is equipped with a contact or terminal $A_1$ connected to an electrical source such as, for example, the battery B of the computing device. The contact 35b is equipped with a contact or terminal $A_2$ connected to an electrical source such as, for example, the battery B of the laptop. As should be understood by those of skill in the art, the resistive element 35a, contact 35b and battery B form a circuit.

By moving the hinge portion $H_2$, the contact 35b will move toward or away from the fixed contact, e.g., contact $A_1$. In this manner, the length of the resistance element 35a through which the current travels can be decreased or increased and, in turn, the current through the circuit can be increased or decreased.

In embodiments, using the rheostat implementation of FIG. 2, the current at different points along the resistance element 35a is known, which correspond to known sweep angles of the display portion 25. As such, the exact position of the display portion 25 can be determined by measuring the current at certain points of the resistance element 35a which correspond to the sweep angle of the display portion 25. In implementation, if the sweep angle is detected to pass a predetermined angle, e.g., 20 degrees, the system of the invention is configured to provide an audible alarm, request password, e.g., entering of a password from the user, and/or commence other countermeasures, as discussed below.

Being even more specific, in the embodiment of FIG. 2, the electrically resistive element 35a is wired into an alarm (and/or countermeasure) circuit such that the resistance fed into the circuit changes as the laptop screen sweeps open or closed (i.e., the hinge acts as a rheostat). When the alarm is first set, the circuit measures the starting resistance. The circuit then continuously compares the saved, starting value against the current value, triggering an alarm (or other countermeasure) if the difference indicates a significant movement, e.g., 20 degrees, or closure of the screen.

Figure 3:
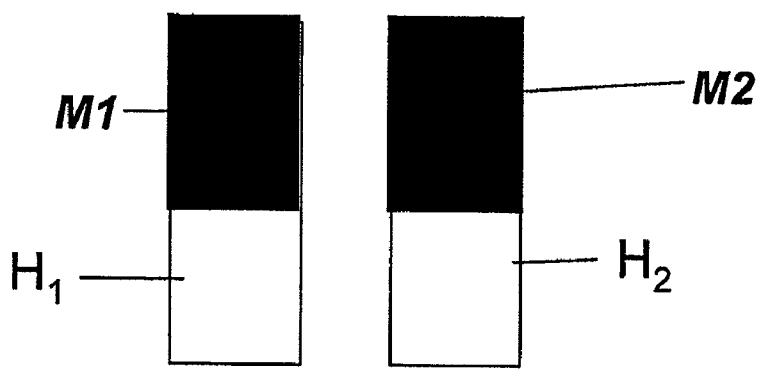
FIG. 3 shows a third embodiment of a sensor according to aspects of the invention

FIG. 3 shows one type of sensor contemplated for use with the present invention. In this embodiment, two metal contacts M1 and M2 are provided on the hinge portions, $H_1$ and $H_2$, respectively. The metal contacts M1 and M2 may be part of the hinge, with remaining portions being coated with a non-metallic coating such as, for example, a plastic material. Similar to the embodiment of FIG. 2, the first portion of the hinge $H_1$ may be attached to the display portion 25 and the second portion of the hinge $H_2$ may be attached to the base portion 20 (or vice versa).

In embodiments, the metal contacts M1 and M2 are placed at certain positions on the hinge portions $H_1$ and $H_2$. More specifically, the metal contacts M1 and M2 are positioned on the hinge portions $H_1$ and $H_2$ so that they will remain in contact through a certain sweep angle of the display portion 25. For example, the metal contacts will remain in contact with one another through a sweep angle of approximately 20 degrees.

In this implementation, beyond an approximately 20 degree sweep angle, for example, the metal contacts M1 and M2 will no longer be in contact. Much like that of FIG. 2, the metal contacts M1 and M2 are wired into an alarm (and/or countermeasure) circuit such that the resistance fed into the circuit changes as the display sweeps open. When the alarm is first set, the alarm circuit measures the starting resistance (1). The circuit would trigger an alarm (or other countermeasure) when the resistance is different from the starting resistance, indicating a movement or closure of the display. Of course, the user can enter a password in order preempt the countermeasures as discussed herein.

In an alternative embodiment to FIG. 3, the metal contacts M1 and M2 are positioned on the hinge portions $H_1$ and $H_2$ so that they are not in contact when the display portion 25 is fully open. In this embodiment, the metal contacts will come into contact with one another at a certain sweep angle, e.g., approximately 20 degrees. Thus, at approximately 20 degree sweep angle, when the circuit is closed, an audible alarm sounds and/or other countermeasure is undertaken by the system. The user can also enter a password, as discussed herein, to terminate the countermeasures. As in any embodiment described herein, it should be understood that other sweep angles could also be used with the invention, depending on the particular requirements or programmed requests of the user or owner of the computing device.

Figure 4:
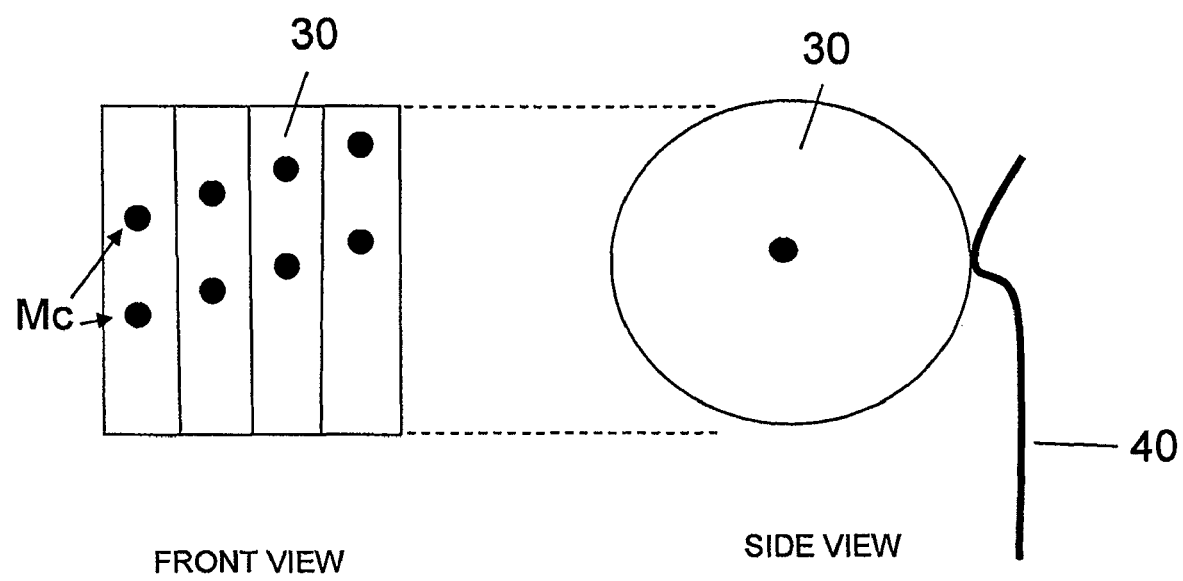
FIG. 4 shows a fourth embodiment of a sensor according to aspects of the invention.

FIG. 4 shows one type of sensor contemplated for use with the present invention. In this implementation, several staggered contacts $M_C$ are provided on the hinge 30, which make contact with a contact portion 40. More particularly, the contacts $M_C$ (e.g., an electrically conductive contact) are positioned in a repeating pattern arranged in bands on the hinge 30. In the example of FIG. 4 there are two contacts per band, with four bands; although, more than two contacts per band can be implemented with the invention, as well as more or less than four bands.

The contact 40, in embodiments, is pressed against the hinge 30 by, for example, an internal spring force of the contact 40 itself. In embodiments, the contact 40 is the width of the hinge 30. In alternative embodiments, the contact 40 is the width of the spacing of the two farthest contacts $M_C$. The contact 40 completes the circuit by contacting one of the contacts $M_C$.

In operation, the contacts $M_C$ are placed at specific locations on the hinge, representing certain angles of the display portion 25. By knowing the position of the contact with respect to the sweep angle of the display portion 25, the system of the invention can determine the sweep angle of the display portion 25 by movement of the display, itself. Thus, by detecting the sequence of the contacts in two or more bands, the system of the invention can sense the hinge rotation and more specifically the sweep angle of the screen portion 25.

More specifically, the staggered sequence of contacts $M_C$ on each band would open and close distinct connections into the circuit as the contacts sweep past a common contact 40 that spans all the bands. Within the circuit are several latches, one per band, that record that the corresponding band has contacted the contact 40. The latches feed into the rest of the circuit, whose output is an alarm signal (or other countermeasure) that is normally disabled. When the alarm is first activated, all the input latches from the hinge bands are cleared and the alarm output signal is enabled. It should be understood, through, that here are several alternative alarm-detection rules that could be implemented by the internal circuitry fed by the latches. For example, if any movement of the screen at all should trigger an alarm, then the circuit would trigger if two or more of the input latches were set. Another, more sophisticated circuit would detect a closure sequence, e.g., 1-2-3-4-1-2-3.

In operation, after the display portion 25 has been opened, the system of the invention may set an audible or silent screen lock which, upon activation, would monitor the display for any movement which might indicate theft is about to occur. Upon movement of the display, the user would have a predetermined number of attempts and/or predetermined amount of time to enter a password before the computing device went into a lock-down state. In embodiments, an alarm can sound alerting persons of the theft, and a signal sent to the owner or other designated person/entity indicating a possible theft of the computing device, perhaps to a PDA or cell phone. Alternatively, or in addition, when the display portion 25 is closed past a threshold angle, e.g., 20 degrees, the computing device can activate countermeasures such as, for example, BIOS lock activation;
Hard drive lock activation;
Power on password activation;
Automatic shutdown;
Erasure and formatting of hard drive;
Activate audible alarm;
CPU lock activation; and/or
Disable the power off capability.

Those of skill in the art without any undue experimentation can implement these countermeasures via known configured computing module(s), circuitry, and/or computing program or code. Any one of these countermeasures may render the computing device useless to a potential thief.

Although the above options are listed to show the range of possibilities, the system and method of the invention also contemplates that some of the countermeasures could be performed in sequence where an additional password expiration period is entered to ensure that the closure was intentional and not an actual theft, e.g., if a legitimate user closes a laptop in haste, packs it into a bag, and drives home for the evening. In this situation, the less drastic measures would be most warranted.

Prior to activation of the countermeasures, the user may have the option of entering a password to disable the countermeasures. In this embodiment, the system will enter a state for a predetermined amount of time, e.g. a few seconds to a few minutes, that allows anyone the capability to defeat the countermeasures through the entry of a password authentication process should the situation be in fact benign.

Figure 5:
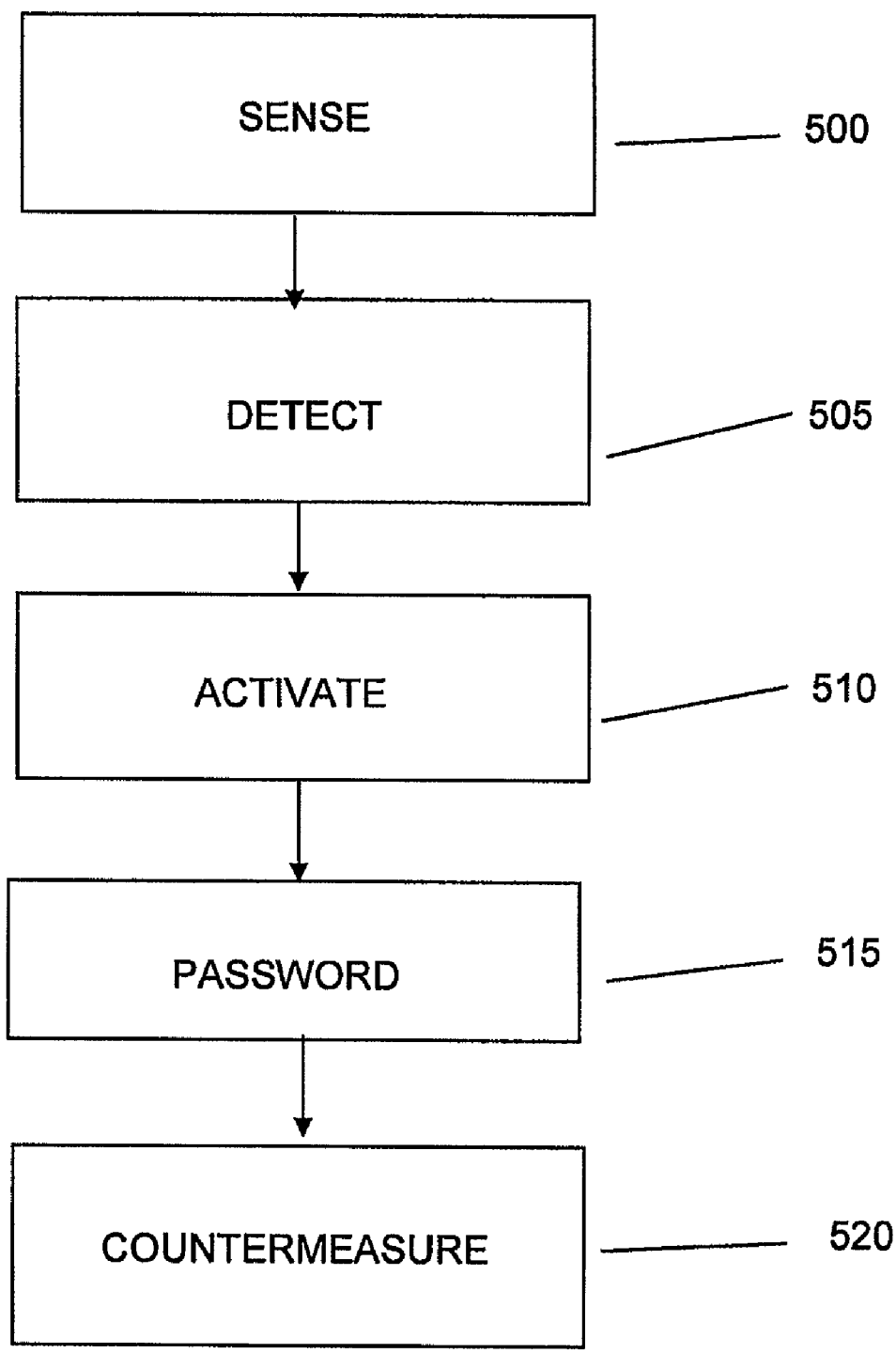
FIG. 5 shows a flow diagram of an exemplary according to aspects of the invention.
Figure 6:
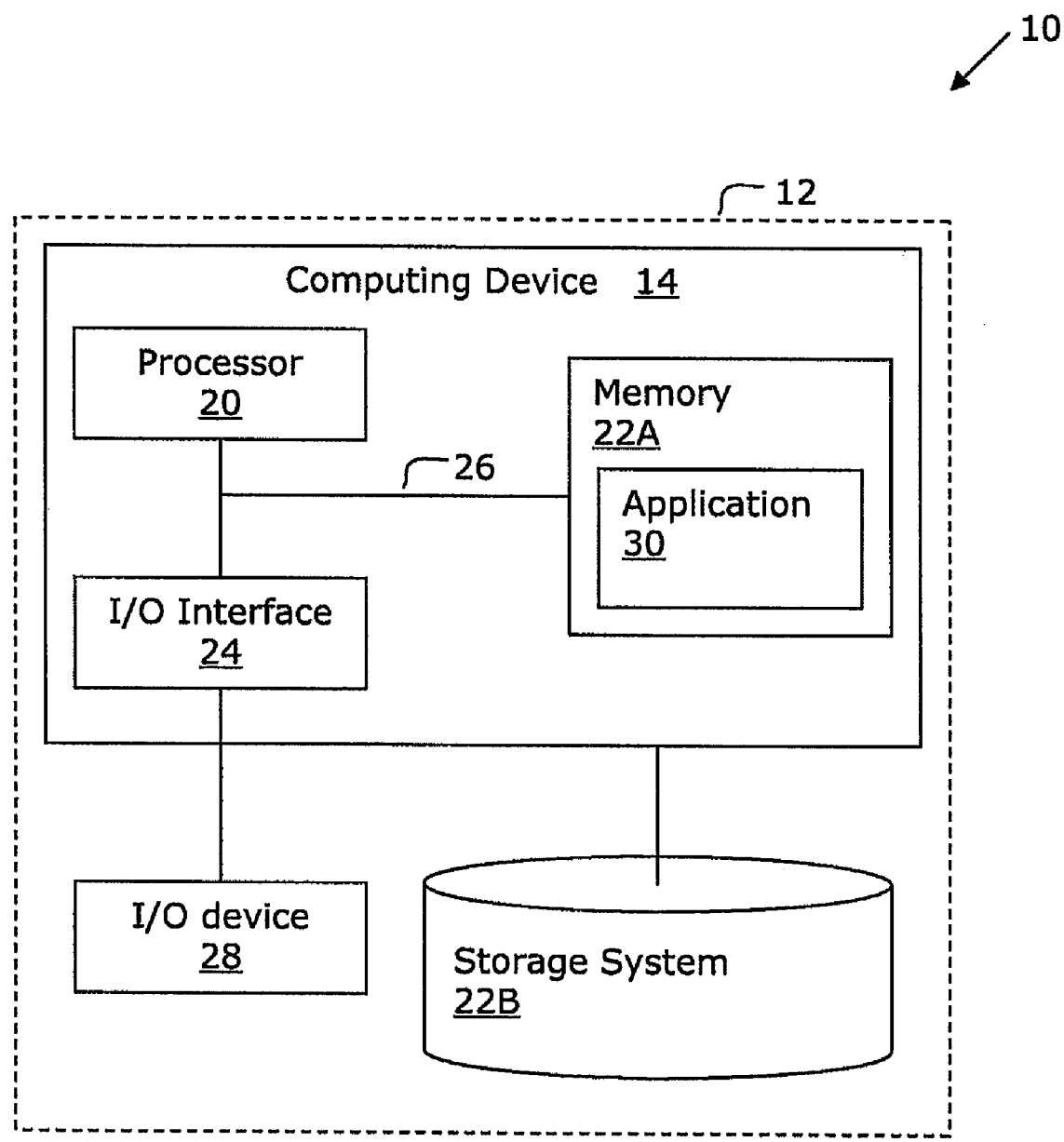
FIG. 6 shows an illustrative environment 10 for managing the processes in accordance with the invention.

FIG. 5 is a flow diagram implementing steps of the invention, which may be implemented in the environment of FIG. 6. FIG. 5 equally represents a high-level block diagram of the invention. The steps of FIG. 5 can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 5. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Referring still to FIG. 5, at step 500, the display angle is detected at a predetermined, i.e., opened angle. At 505, the display is sensed to be outside a predefined range (the display is detected be located outside an allowable sweep angle). At step 510, the silent or audible alarm is activated. At step 515, optionally, a password period begins providing the user ample time to enter a password prior to countermeasures taking place. In embodiments, the user is provided a password screen to authenticate so as to prevent expiration of the password period. If the user succeeds in authentication, the password periods ends and no countermeasures are taken by the system of the invention. If the user fails in authentication and once the password period ends, an alert and/or countermeasure event is triggered at step 520. According to the preprogrammed situation, one or more of the above countermeasures can take place.

FIG. 6 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform the process described herein. The computing device 14 includes a processor 20, a memory 22A, an input/output (I/O) interface 24, and a bus 26. Further, the computing device 14 is in communication with an external I/O device/resource 28 and a storage system 22B.

The processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the process steps of the invention on a subscription, advertising, and/or fee basis. That is, a service provider, such as a Solution Integrator, could offer to perform the processes described herein. In this case, the service provider can create, deploy, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties. In one example, the service may trigger the countermeasures remotely, if a password is not entered in a predetermined amount of time.

Figure 7:
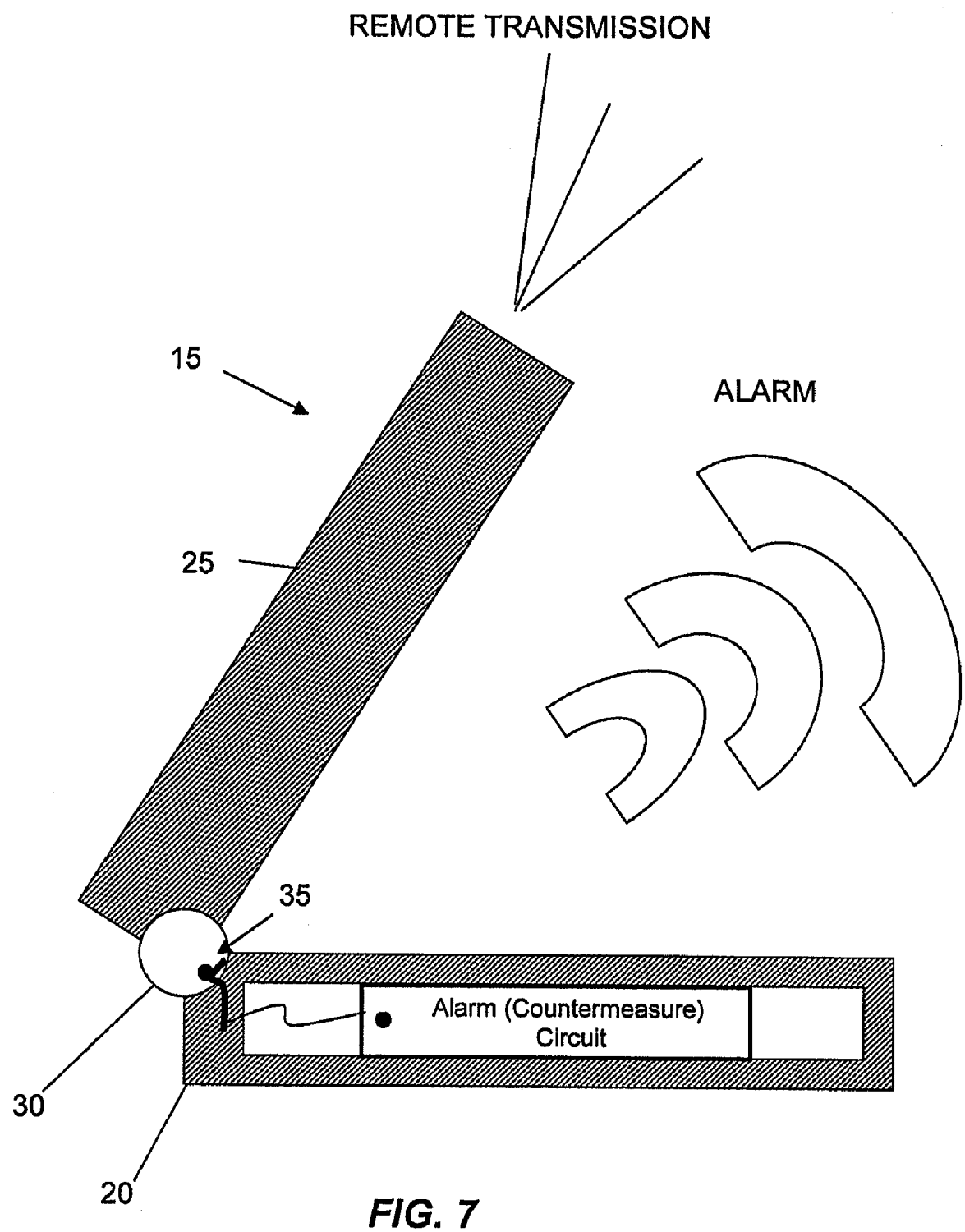
FIG. 7 shows a computing device with the display portion in a partially closed position.

FIG. 7 shows the computing device of FIG. 1, outside an allowed sweep angle range. As shown graphically, an audible alert is sounded. In embodiment, a wireless transmission may be sent to the user, a service provider or other designated person or entity. The service provider or other designated person may trigger the countermeasures remotely, if a password is not entered in a predetermined amount of time.

While the invention has been described in terms of embodiments, those skilled in the art will recognize that the invention can be practiced with modifications and in the spirit and scope of the appended claims.

The invention claimed is:

1. A device, comprising:
    a base portion;
    a display portion hingedly attached to the base portion;
    a sensor configured to detect a motion of the display portion with respect to the base portion; and
    a system configured to be activated when the sensor detects a motion of the display portion outside a predetermined location.

2. The device of claim 1, wherein the system is an alarm.

3. The device of claim 1, wherein the system is a countermeasure module or program code configured to perform a countermeasure in response to the motion of the display portion.

4. The device of claim 3, wherein a service provider deploys the countermeasure module or program code.

5. The device of claim 3, wherein the countermeasure includes an alarm.

6. The device of claim 3, wherein the countermeasure is at least one of: BIOS lock activation; hard drive lock activation; power on password activation; automatic shutdown; erasure and formatting of hard drive; activate audible alarm; and CPU lock activation; and/or disable power off capability.

7. The device of claim 1, wherein the sensor is a rheostat configured to determine a sweep angle of the display portion, wherein the rheostat includes a resistive element and a contact, the resistive element and the contact being equipped with a terminal connected to an electrical source.

8. The device of claim 1, wherein the sensor includes contacts provided on hinge portions which hingedly attach the base portion to the display portion, the contacts being part of the hinge portions, with remaining portions of the hinge portions being coated with a non-metallic coating.

9. The device of claim 1, wherein the sensor includes staggered contacts provided on a hinge, which make contact with a contact portion.

10. The device of claim 9, wherein the staggered contacts are one or more contacts per band.

11. The device of claim 9, wherein the contact portion is one of:
    pressed against the hinge by an internal spring force of the contact;
    a width of the hinge; and
    a width of a spacing of the two farthest staggered contacts.

12. The device of claim 1, further comprising a wireless-transmitting device.

13. The device of claim 1, wherein the sensor is configured to sense a sweep angle of the display portion.

14. A device, comprising:
    a base portion;
    a display portion;
    a hinge attaching the base portion to the display portion;
    a sensor configured to detect a closing motion of the display portion with respect to the base portion, wherein the sensor is a rheostat configured to determine a sweep angle of the display portion; and
    circuitry for responding to the detection of the closing motion of the display portion.

15. The device of claim 14, wherein the circuitry is an audible alarm triggered when the sensor detects that the display portion moved beyond a predetermined limit.

16. The device of claim 14, wherein the circuitry provides a countermeasure when the sensor detects that the display portion moved beyond a predetermined limit.

17. The device of claim 16, wherein the countermeasure is at least one of: BIOS lock activation; hard drive lock activation; power on password activation; automatic shutdown; erasure and formatting of hard drive; activate audible alarm; and CPU lock activation; and/or disable power off capability.

18. The device of claim 14, wherein the sensor includes contacts provided on hinge portions of the hinge.

19. The device of claim 14, wherein the sensor includes several staggered contacts provided on the hinge, which make contact with a contact portion and the staggered contacts are positioned in a repeating pattern arranged in bands on the hinge.

20. The device of claim 19, wherein the staggered contacts are one or more contacts per band, and the contact portion is one of a width of the hinge and a width of a spacing of the two farthest staggered contacts.

21. The device of claim 14, further comprising a wireless-transmitting device.

22. A method, comprising:

detecting an open position of a display portion of a computing device;

sensing a motion of the display portion outside a predefined range with respect to a base portion of the computing device; and performing at least one countermeasure after a predetermined time has elapsed after the sensed motion.

23. The method of claim 22, wherein the at least one countermeasure is maintained, deployed, maintained or managed by a service provider for a fee.

24. The method of claim 22, further comprising providing an audible alarm in response to the sensed motion of the display portion.

25. A method, comprising:

detecting an open position of a display portion of a computing device;

sensing a motion of the display portion outside a predefined range; and performing at least one countermeasure after a predetermined time has elapsed after the sensed motion, wherein the motion is a sweep angle of the display portion.

26. A system comprising at least one of a hardware and software component which provides theft deterrence for a user of a portable computing device, the at least one of a hardware and software component configured to:

detect an open position of a display portion of a computing device;

sense a motion of the display portion to be outside a predefined range; and perform a countermeasure after a predetermined time has elapsed after the sensed motion.

* * * * *